US010289340B2

(12) United States Patent
O'Krafka et al.

(10) Patent No.: US 10,289,340 B2
(45) Date of Patent: May 14, 2019

(54) COALESCING METADATA AND DATA WRITES VIA WRITE SERIALIZATION WITH DEVICE-LEVEL ADDRESS REMAPPING

(71) Applicant: SanDisk Technologies LLC, Plano, TX (US)

(72) Inventors: Brian W. O'Krafka, Austin, TX (US); Johann George, Sunnyvale, CA (US); Vladislav Bolkhovitin, San Jose, CA (US); Manavalan Krishnan, Fremont, CA (US); Evgeniy Firsov, Palo Alto, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 15/428,086

(22) Filed: Feb. 8, 2017

(65) Prior Publication Data
US 2017/0242626 A1 Aug. 24, 2017

Related U.S. Application Data

(60) Provisional application No. 62/298,929, filed on Feb. 23, 2016.

(51) Int. Cl.
*G06F 3/06* (2006.01)
*G06F 12/02* (2006.01)
*G06F 12/0866* (2016.01)

(52) U.S. Cl.
CPC ............ *G06F 3/0659* (2013.01); *G06F 3/064* (2013.01); *G06F 3/0611* (2013.01);
(Continued)

(58) Field of Classification Search
CPC ............ G06F 12/0253; G06F 12/0269; G06F 12/0279; G06F 2212/70; G06F 2212/702; G06F 2212/7205
See application file for complete search history.

(56) References Cited

U.S. PATENT DOCUMENTS 7,710,777 B1 5/2010 Montierth et al.
7,996,642 B1 8/2011 Smith
(Continued)

FOREIGN PATENT DOCUMENTS

WO WO 2015/047398 4/2015
WO WO 2015/152830 10/2015

OTHER PUBLICATIONS

Wilson's : "Working Draft SCSI Extended Copy Command," Apr. 2, 1999, http://www.t10.org/ftp/t10/document.99/99-143r1.pdf, 34pages.
(Continued)

*Primary Examiner* — Tracy A Warren
(74) *Attorney, Agent, or Firm* — Morgan, Lewis & Bockius LLP

(57) ABSTRACT

Systems, methods and/or devices are used to coalesce metadata and data writes via write serialization with device-level address remapping. In one aspect, a method of managing a storage system having one or more storage devices includes a serialized write operation to the storage system, in which a serialization segment accumulates data objects and mapping information until the segment is full, at which time the serialization segment is written to the storage system in a single contiguous write. As a result, the number of I/O operations is decreased from a minimum of two (one to write data and one to write updated mapping information) to a single write operation. Further, if the serialization segment contains existing valid data prior to accumulating data objects and mapping information, the valid data is moved to the beginning of the serialization segment using either a remap or xcopy operation.

20 Claims, 8 Drawing Sheets

(52) U.S. Cl.
CPC ........ *G06F 3/0679* (2013.01); *G06F 12/0246* (2013.01); *G06F 12/0866* (2013.01); *G06F 2212/1024* (2013.01); *G06F 2212/466* (2013.01); *G06F 2212/7201* (2013.01); *G06F 2212/7203* (2013.01); *G06F 2212/7208* (2013.01)

(56) References Cited

U.S. PATENT DOCUMENTS

| | | | |
|---|---|---|---|
| 8,316,201 B2* | 11/2012 | Stern | G06F 11/1008 711/165 |
| 9,158,681 B1 | 10/2015 | Samuels et al. | |
| 9,170,938 B1 | 10/2015 | Walsh et al. | |
| 9,720,596 B1* | 8/2017 | Bono | G06F 3/0608 |
| 2003/0229627 A1 | 12/2003 | Carlson et al. | |
| 2004/0167898 A1 | 8/2004 | Margolus et al. | |
| 2006/0159109 A1 | 7/2006 | Lamkin et al. | |
| 2007/0156842 A1 | 7/2007 | Vermeulen et al. | |
| 2007/0174309 A1 | 7/2007 | Pettovello | |
| 2007/0185902 A1 | 8/2007 | Messinger et al. | |
| 2009/0012976 A1 | 1/2009 | Kang et al. | |
| 2009/0119450 A1 | 5/2009 | Saeki et al. | |
| 2011/0145512 A1 | 6/2011 | Adl-Tabatabai et al. | |
| 2011/0252067 A1 | 10/2011 | Marathe et al. | |
| 2012/0005419 A1 | 1/2012 | Wu et al. | |
| 2012/0117328 A1 | 5/2012 | McKean et al. | |
| 2012/0166360 A1 | 6/2012 | Shah et al. | |
| 2012/0179645 A1 | 7/2012 | Lomet et al. | |
| 2012/0259863 A1 | 10/2012 | Bodwin et al. | |
| 2014/0075100 A1 | 3/2014 | Kaneko et al. | |
| 2014/0185376 A1 | 7/2014 | Sinclair et al. | |
| 2014/0189211 A1 | 7/2014 | George et al. | |
| 2014/0281138 A1* | 9/2014 | Karamcheti | G06F 12/0246 711/103 |
| 2015/0193488 A1* | 7/2015 | Demidov | G06F 17/30327 707/693 |
| 2015/0212752 A1 | 7/2015 | Nemazie et al. | |
| 2015/0242307 A1 | 8/2015 | Busaba et al. | |
| 2015/0253999 A1 | 9/2015 | Nemazie et al. | |
| 2015/0277794 A1 | 10/2015 | Tudor et al. | |
| 2015/0278093 A1 | 10/2015 | O'Krafka et al. | |
| 2015/0281389 A1 | 10/2015 | Firsov et al. | |
| 2015/0370492 A1 | 12/2015 | Satnur et al. | |
| 2015/0370701 A1 | 12/2015 | Higgins et al. | |
| 2015/0378884 A1 | 12/2015 | Nemazie et al. | |
| 2016/0034507 A1 | 2/2016 | Aron et al. | |
| 2016/0085464 A1 | 3/2016 | Tuers et al. | |
| 2016/0132265 A1 | 5/2016 | Yi et al. | |
| 2016/0299715 A1 | 10/2016 | Hashimoto et al. | |
| 2016/0321010 A1 | 11/2016 | Hashimoto | |
| 2016/0321294 A1 | 11/2016 | Wang et al. | |
| 2016/0335299 A1 | 11/2016 | Vemulapati et al. | |
| 2017/0075781 A1 | 3/2017 | Bennett, Jr. et al. | |
| 2017/0242785 A1 | 8/2017 | O'Krafka et al. | |

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Sep. 14, 2016, received in International Patent Application No. PCT/US2016/036720, which corresponds to U.S. Appl. No. 15/144,704, 12 pages (Cheru).

International Search Report and Written Opinion dated Mar. 15, 2017, received in International Patent Application No. PCT/US2016/067728, which corresponds to U.S. Appl. No. 15/208,540, 14 pages (O'Krafka).

* cited by examiner

Secondary Mapping Table 236

| Node Logical ID | A | B | C | D | ... |
|---|---|---|---|---|---|
| Node Physical Location | 5014 | 183 | 476 | 813 | ... |

COALESCING METADATA AND DATA WRITES VIA WRITE SERIALIZATION WITH DEVICE-LEVEL ADDRESS REMAPPING

RELATED APPLICATIONS

This application claims priority to U.S. Provisional Patent Application No. 62/298,929, filed Feb. 23, 2016, which is hereby incorporated by reference in its entirety.

TECHNICAL FIELD

The disclosed embodiments relate generally to memory systems, and in particular, to coalescing metadata and data writes via write serialization with device-level address remapping in a non-volatile storage device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes of the data objects (sometimes called metadata) are stored. When writing an object and attributes of the object to the tiered data structure, for example in response to a host computer command, typical tiered data structure mapping algorithms require two I/O operations, one to write data and one to write updated metadata. Furthermore, when writing an object and N attributes of the object to the tiered data structure, typically N+2 nodes of the data structure (assuming the data object can be written in its entirety into a single node) would need to be updated, and thus rewritten, whereas the total amount of data to be written would typically be less than the total capacity of two (2) nodes. As a result, there is "write amplification" that is on the order of (N+2)/X, where X is the total amount of data to be written in units of nodes.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to perform coalescing metadata and data writes via write serialization with device-level address remapping in a non-volatile storage device. In one aspect, a method of managing a storage system having one or more storage devices includes a serialized write operation to the storage system, in which a serialization segment accumulates data objects and mapping information until the segment is full, at which time the serialization segment is written to the storage system in a single contiguous write. As a result, the number of I/O operations is decreased from a minimum of two write operations (one to write data and one to write updated mapping information) to a single write operation.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1:
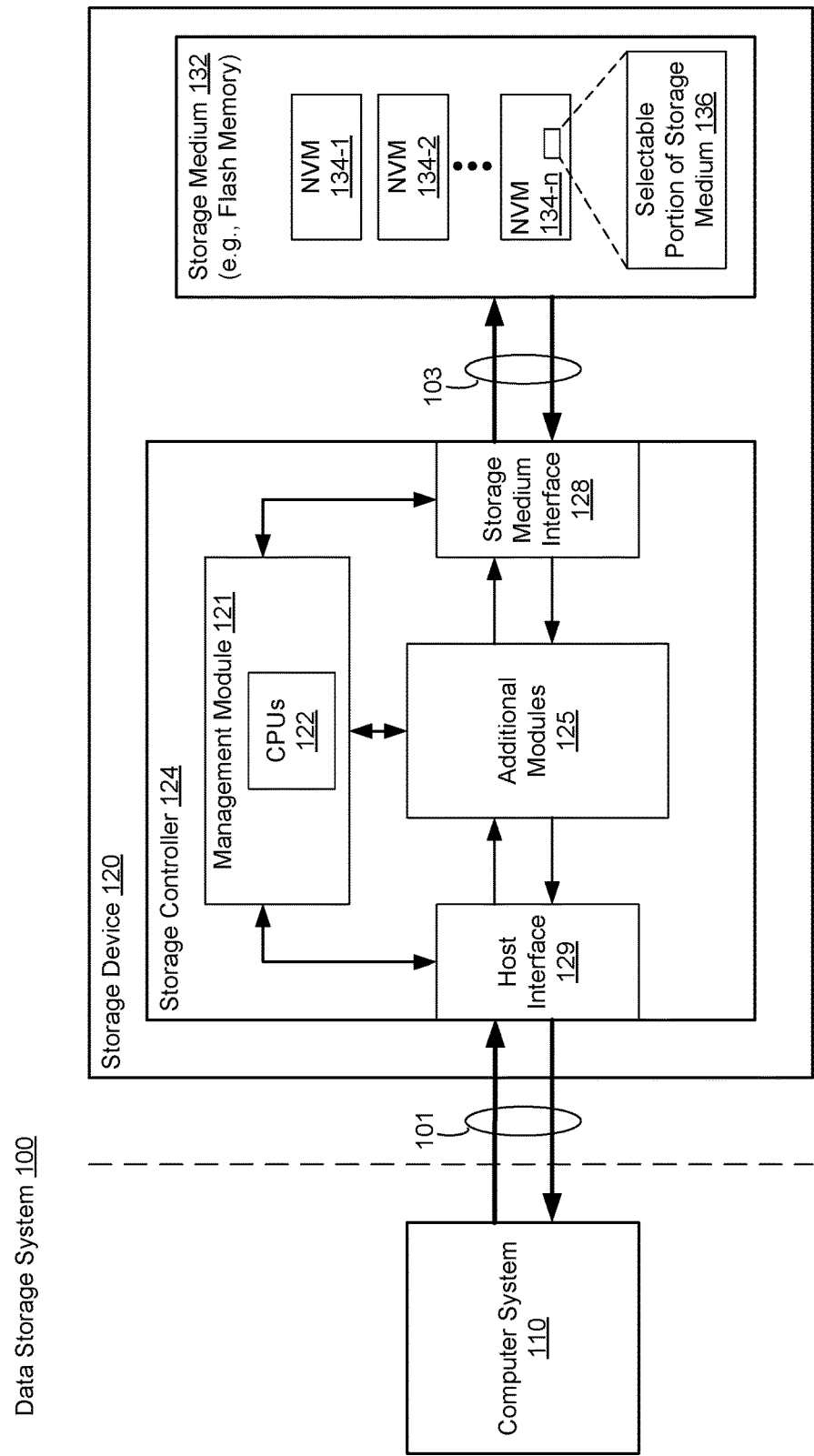
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes (sometimes called metadata) are stored. Tiered data structures can be used to dramatically improve the speed and efficiency of data storage. However, further improvements to tiered data structures can further increase the speed, efficiency, and reliability with which data can be stored and retrieved, thereby improving the performance of devices relying on such tiered data structures. The various embodiments described herein include systems, methods and/or devices used to improve performance of devices relying on tiered data structures by coalescing metadata and data writes via write serialization with device-level address remapping.

(A1) More specifically, some embodiments include a method of managing a storage system having a plurality of storage devices. In some embodiments, the method includes detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object. The method also includes creating a serialization segment in a memory, distinct from the plurality of storage devices, wherein creating the serialization segment includes: coalescing valid data in the serialization segment, including: for each contiguous sequence of valid logical addresses in the serialization segment, (1) sending instructions from the host system to one or more storage devices of the plurality of storage devices to move data corresponding to the respective contiguous sequence of valid logical addresses; and (2) repacking valid logical addresses in the serialization segment to a beginning of the serialization segment. The method further includes accumulating, in the serialization segment, the first write of updated mapping information to the tiered data structure and the second write of the data to be written, and writing, in a single contiguous write, contents of the serialization segment, other than the coalesced valid data, to one or more storage devices of the plurality of storage devices of the storage system.

(A2) In some embodiments of the method of A1, the instructions to move data include remap instructions that change logical addresses in the serialization segment associated with memory portions in the plurality of storage devices from initial logical addresses to new logical addresses in the serialization segment, without causing physical movement of data.

(A3) In some embodiments of the method of A1, the instructions to move data include copy instructions that copy data corresponding to valid logical addresses in the serialization segment from initial memory portions in the plurality of storage devices to different memory portions in the plurality of storage devices corresponding to new logical addresses in the serialization segment.

(A4) In some embodiments of the method of any of A1 to A3, the method further includes, identifying the serialization segment, from among a plurality of serialization segments, in accordance with one or more predefined characteristics of the data to be written.

(A5) In some embodiments of the method of any of A1 to A4, the serialization segment corresponds to a selected stripe of a plurality of stripes of logical address space and identifying the serialization segment includes identifying the serialization segment in accordance with selection criteria.

(A6) In some embodiments of the method of A5, each stripe of the plurality of stripes of logical address space corresponds to one or more erase blocks in the plurality of storage devices.

(A7) In some embodiments of the method of A5, each stripe of the plurality of stripes of logical address space corresponds to a RAID stripe.

(A8) In some embodiments of the method of any of A1 to A7, coalescing valid data is performed during garbage collection.

(A9) In some embodiments of the method of any of A1 to A8, the first write and the second write are accumulated in the serialization segment after the coalesced valid data.

(A10) In some embodiments of the method of any of A1 to A9, the memory is a non-volatile random-access memory (NVRAM).

(A11) In some embodiments of the method of any of A1 to A10, writing the contents of the serialization segment to one or more storage devices of the plurality of storage devices of the storage system is performed in accordance with a determination that the serialization segment is full.

(A12) In some embodiments of the method of any of A1 to A11, writing the contents of the serialization segment to one or more storage devices of the plurality of storage devices of the storage system is performed in accordance with a batch commit algorithm, wherein one or more writes accumulated in the serialization segment within a predefined time period are written in the single contiguous write.

(A13) In some embodiments of the method of any of A1 to A12, the method is controlled by a host that includes a client on behalf of which data is stored in the storage system.

(A14) In some embodiments of the method of any of A1 to A12, the method is controlled by a host that includes a storage system controller of the storage system.

(A15) In some embodiments of the method of any of A1 to A12, the method is controlled by a host that includes a cluster controller of the storage system.

(A16) In some embodiments of the method of any of A1 to A15, the plurality of storage devices comprises one or more flash memory devices.

(A17) In another aspect, a host system includes an interface for operatively coupling to a storage system having a plurality of storage devices, one or more processors, and controller memory (e.g., non-volatile memory or volatile memory in or coupled to the controller) storing one or more programs. The one or more programs include instructions that when executed by the one or more processors cause the host system to perform operations including detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object. The one or more programs include instructions that when executed by the one or more processors cause the host system to perform further operations including creating a serialization segment in a memory, distinct from the plurality of storage devices, wherein creating the serialization segment includes: coalescing valid data in the serialization segment, including: for each contiguous sequence of valid logical addresses in the serialization segment, (1) sending instructions from the host system to one or more storage devices of the plurality of storage devices to move data corresponding to the respective contiguous sequence of valid logical addresses; and (2) repacking valid logical addresses in the serialization segment to a beginning of the serialization segment. The one or more programs include instructions that when executed by the one or more processors cause the host system to perform further operations including accumulating, in the serialization segment, the first write of updated mapping information to the tiered data structure and the second write of the data to be written, and writing, in a single contiguous write, contents of the serialization segment, other than the coalesced valid data, to one or more storage devices of the plurality of storage devices of the storage system.

(A18) In some embodiments of the host system of A17, the one or more programs include a coalescing module having instructions for coalescing valid data in the serialization segment, including sending instructions to the one or more storage devices of the plurality of storage devices to move valid data, and repacking valid logical addresses in the serialization segment. Further, the one or more programs include a serialization module having instructions for serializing data and updated mapping information in the serialization segment.

(A19) In some embodiments of the host system of A17 or A18, the one or more programs include instructions that when executed by the one or more processors cause the host system to perform or control performance of any of the methods A2 to A16 described herein.

(A20) In yet another aspect, any of the methods A1 to A16 described above are performed by a host system including means for performing any of the methods described herein.

(A21) In yet another aspect, a storage system includes a storage medium (e.g., comprising one or more non-volatile storage devices, such as flash memory devices), one or more processors, and memory (e.g., non-volatile memory or volatile memory in the storage system) storing one or more programs, which when executed by the one or more processors cause the storage system to perform or control performance of any of the methods A1 to A16 described herein.

(A22) In yet another aspect, some embodiments include a non-transitory computer readable storage medium, storing one or more programs configured for execution by one or more processors of a storage device, the one or more programs including instructions for performing any of the methods A1 to A16 described herein.

(A23) In yet another aspect, a storage system includes a plurality of storage devices, one or more subsystems having one or more processors, and memory storing one or more programs. The one or more programs include instructions that when executed by the one or more processors cause the storage system to perform operations including detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object. The one or more programs include instructions that when executed by the one or more processors cause the storage system to perform further operations including creating a serialization segment in a memory, distinct from the plurality of storage devices, wherein creating the serialization segment includes: coalescing valid data in the serialization segment, including: for each contiguous sequence of valid logical addresses in the serialization segment, (1) sending instructions from the host system to one or more storage devices of the plurality of storage devices to move data corresponding to the respective contiguous sequence of valid logical addresses; and (2) repacking valid logical addresses in the serialization segment to a beginning of the serialization segment. The one or more programs include instructions that when executed by the one or more processors cause the storage system to perform further operations including accumulating, in the serialization segment, the first write of updated mapping information to the tiered data structure and the second write of the data to be written, and writing, in a single contiguous write, contents of the serialization segment, other than the coalesced valid data, to one or more storage devices of the plurality of storage devices of the storage system.

(A24) In some embodiments of the storage system of A23, the one or more programs include instructions that when executed by the one or more processors cause the storage system to perform or control performance of any of the methods A2 to A16 described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices (e.g., NVM 134-1, NVM 134-2 through NVM 134-n) including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Memory devices (NVM 134-1, NVM 134-2, etc.) of storage medium 132 include addressable and individually selectable blocks, such as selectable portion of storage medium 136 (also referred to herein as selected portion 136). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable and writable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing and reading data to and from the flash memory device.

In some embodiments, storage controller 124 includes a management module 121, a host interface 129, a storage medium interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory).

In some embodiments, management module 121 includes one or more processing units 122 (also sometimes called processors, hardware processors, CPUs or the like) configured to execute instructions in one or more programs (e.g., in management module 121). In some embodiments, the one or more CPUs 122 are shared by one or more components within, and in some cases, beyond the function of storage controller 124. Management module 121 is coupled to host interface 129, additional module(s) 125 and storage medium interface 128 in order to coordinate the operation of these components. In some embodiments, one or more modules of management module 121 are implemented in computer system 110, as discussed in more detail below.

Additional module(s) 125 are coupled to storage medium interface 128, host interface 129, and management module 121. As an example, additional module(s) 125 may include an error control module to limit the number of uncorrectable errors inadvertently introduced into data during writes to memory or reads from memory. In some embodiments, an error control module, included in additional module(s) 125, includes an encoder and a decoder. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, a write operation is initiated when computer system (host) 110 sends one or more host write commands (e.g., via data connections 101, or alternatively a separate control line or bus) to storage controller 124. In response, storage controller 124 sends one or more write access commands to storage medium 132, from storage medium interface 128 (e.g., via data connections 103, or alternatively a separate control line or bus), to write data to physical memory locations (addresses) within storage medium 132.

In some embodiments, during a write operation, host interface 129 receives data to be stored in storage medium 132 from computer system 110. The data received by host interface 129 is made available to an encoder (e.g., in additional module(s) 125), which encodes the data.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, from storage medium interface 128 (e.g., via data connections 103, or alternatively a separate control line or bus), to obtain raw read data in accordance with physical memory locations (addresses) within storage medium 132.

In some embodiments, storage medium interface 128 provides the raw read data to a decoder (e.g., in additional module(s) 125). If the decoding is successful, the decoded data is provided to host interface 129, where the decoded data is made available to computer system 110, or is provided to computer system 110 as a response to the host read command. In some embodiments, if the decoding is not successful, storage controller 124 may resort to a number of remedial actions or provide an indication of an irresolvable error condition.

As explained above, a storage medium (e.g., storage medium 132) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells (SLC) or multi-level cells (MLC)). In some embodiments, programming is performed on an entire page.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 132) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \quad (1)$$

One of the goals of any storage system architecture is to reduce write amplification as much as possible so that available endurance is used to meet storage medium reliability and warranty specifications. Higher system endurance also results in lower cost as the storage system may need less over-provisioning. By reducing the write amplification, the endurance of the storage medium is increased and the overall cost of the storage system is decreased. Generally, garbage collection is performed on erase blocks with the fewest number of valid pages for best performance and best write amplification. However, since different erase blocks have different wear characteristics, it is important to use erase blocks based on how much life a respective erase block has left, rather than simply the number of program-erase cycles performed on the respective erase block thus far.

Figure 2A:
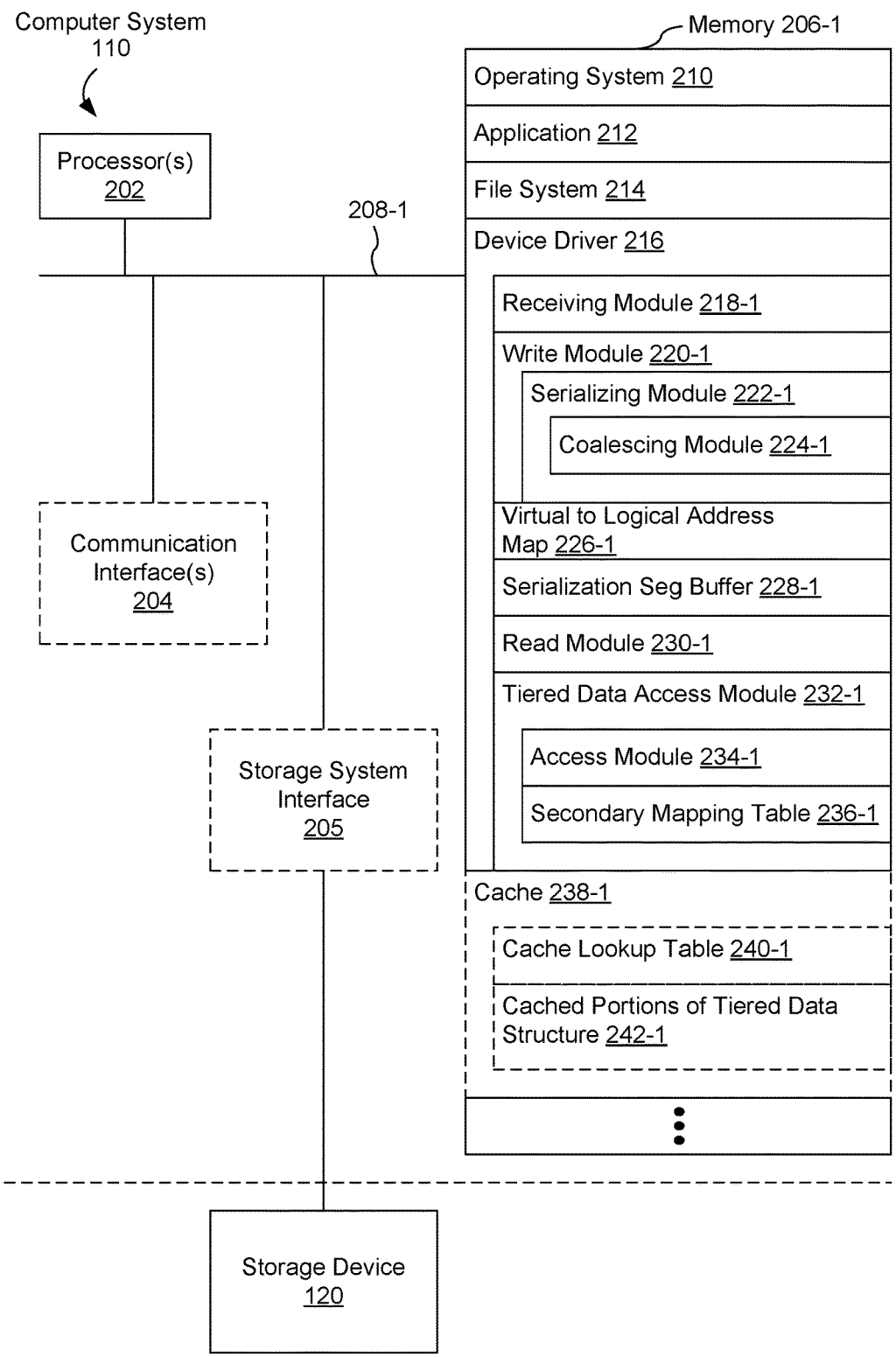
FIG. 2A is a block diagram illustrating a host computing device, in accordance with some embodiments.

FIG. 2A is a block diagram illustrating an implementation of a computer system 110, in accordance with some embodiments. Computer system 110 typically includes one or more processors 202 (also sometimes called CPUs, processing units, hardware processors, microprocessors or microcontrollers) for executing modules, programs and/or instructions stored in memory 206-1 and thereby performing processing operations, memory 206-1, and one or more communication buses 208-1 for interconnecting these components. Communication buses 208-1 optionally include circuitry (sometimes called a chipset) that interconnects and controls communications between system components. In some embodiments, such as those represented by FIG. 1, computer system 110 is coupled to storage device 120 by communication buses 208-1 and a storage system interface 205. In some embodiments, computer system 110, includes one or more communication interfaces 204 for coupling computer system 110 to other systems (not shown), e.g., via a communications network such as the internet, an intranet, or local area network, or the like.

Memory 206-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-1 optionally includes one or more storage devices remotely located from processor(s) 202. Memory 206-1, or alternately the non-volatile memory device(s) within memory 206-1, comprises a non-transitory computer readable storage medium. In some embodiments, memory 206-1, or the computer readable storage medium of memory 206-1 stores the following programs, modules, and data structures, or a subset thereof:

an operating system 210, which includes procedures for handling various basic system services and for performing hardware dependent tasks;
an application 212;
a file system 214;
a device driver 216 for accessing storage device 120, including:
    a receiving module 218-1 used for receiving host access commands;
    a write module 220-1 used for writing data to storage device 120, including:
        a serializing module 222-1 used for serializing multiple small write data operations into a single larger write data operation, including:
            a coalescing module 224-1 used for moving existing valid data and repacking valid logical addresses in a serialization segment;
        a logical to physical and physical to logical address map 226-1 used for maintaining a mapping of logical addresses to physical addresses and vice versa;
        a serialization segment buffer 228-1 used for buffering multiple write data operations;
    a read module 230-1 used for reading data from storage device 120;
    a tiered data structure access module 232-1 used for accessing a tiered data structure (e.g., tiered data structure 300, FIG. 3, which may be stored in storage medium 132 of storage device 120), including:
        an access module 234-1 used for accessing nodes within the tiered data structure; and
        a secondary mapping table 236-1 used for translating logical IDs of leaf nodes to physical locations of leaf nodes;
a cache 238-1 for caching mapping data, including:
    a cache lookup table 240-1 for locating nodes of a tiered data structure stored (i.e., cached) in cache 238-1; and
    cached portions 242-1 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-1 may store a subset of the modules and data structures identified above. Furthermore, memory 206-1 may store additional modules and data structures not described above. In some embodiments, the programs, modules, and data structures stored in memory 206-1, or the computer readable storage medium of memory 206-1, provide instructions for implementing respective operations in the methods described below with reference to FIGS. 3, 4, and 5A-5C.

Although FIG. 2A shows computer system 110 in accordance with some embodiments, FIG. 2A is intended more as a functional description of the various features which may be present in computer system 110 than as a structural schematic of the embodiments described herein. In practice, and as recognized by those of ordinary skill in the art, the programs, modules, and data structures shown separately could be combined and some programs, modules, and data structures could be separated.

Figures 2B, 2C:
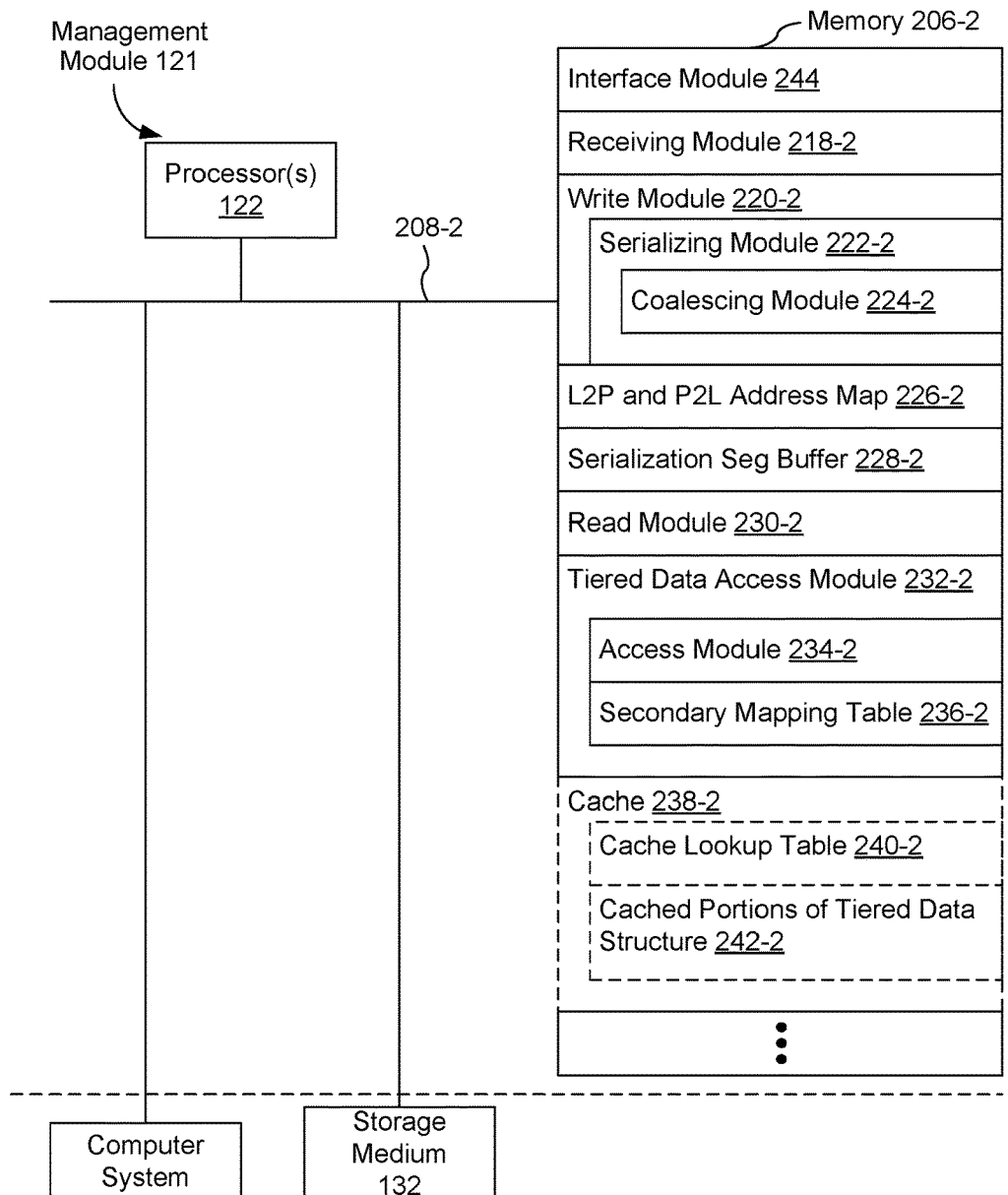
FIG. 2B is a block diagram illustrating a memory management module of a non-volatile memory controller, in accordance with some embodiments.
FIG. 2C is a diagram illustrating a secondary mapping table included in FIGS. 2A and 2B in accordance with some embodiments.

FIG. 2B is a block diagram illustrating an implementation of a management module 121, in accordance with some embodiments. Management module 121 typically includes one or more processors 122 (also sometimes called CPUs, processing units, hardware processors, microprocessors or microcontrollers) for executing modules, programs and/or instructions stored in memory 206-2 and thereby performing processing operations, memory 206-2, and one or more communication buses 208-2 for interconnecting these components. Communication buses 208-2 optionally include circuitry (sometimes called a chipset) that interconnects and controls communications between system components. In some embodiments, such as those represented by FIG. 1, management module 121 is coupled to computer system 110 and storage medium 132 by communication buses 208-2. Memory 206-2 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-2 optionally includes one or more storage devices remotely located from processor(s) 122. Memory 206-2, or alternately the non-volatile memory device(s) within memory 206-2, comprises a non-transitory computer readable storage medium. In some embodiments, memory 206-2, or the computer readable storage medium of memory 206-2 stores the following programs, modules, and data structures, or a subset thereof:

- an interface module 244 that is used for communicating with other components, such as non-volatile memory devices 134;
- a receiving module 218-2 for receiving host access commands;
- a write module 220-2 used for writing to non-volatile memory devices 134, including:
  - a serializing module 222-2 used for serializing multiple small write data operations into a single larger write data operation, including:
    - a coalescing module 224-2 used for moving existing valid data and repacking valid logical addresses in a serialization segment;
- a logical to physical and physical to logical address map 226-2 used for maintaining a mapping of logical addresses to physical addresses and vice versa;
- a serialization segment buffer 228-2 used for buffering multiple write data operations;
- a read module 230-2 used for reading from non-volatile memory devices 134;
- a tiered data structure access module 232-2 used for accessing a tiered data structure (e.g., tiered data structure 300, FIG. 3, which may be stored in storage medium 132 of storage device 120), including:
  - an access module 234-2 used for accessing nodes within a tiered data structure;
  - a secondary mapping table 236-2 used for translating logical IDs of leaf nodes to physical locations of leaf nodes;
- a cache 238-2 for caching mapping data, including:
  - a cache lookup table 240-2 for locating nodes of a tiered data structure stored (i.e., cached) in cache 238-2; and
  - cached portions 242-2 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-2 may store a subset of the modules and data structures identified above. Furthermore, memory 206-2 may store additional modules and data structures not described above. In some embodiments, the programs, modules, and data structures stored in memory 206-2, or the computer readable storage medium of memory 206-2, provide instructions for implementing respective operations in the methods described below with reference to FIGS. 3, 4, and 5A-5C.

Although FIG. 2B shows management module 121 in accordance with some embodiments, FIG. 2B is intended more as a functional description of the various features which may be present in management module 121 than as a structural schematic of the embodiments described herein. In practice, and as recognized by those of ordinary skill in the art, the programs, modules, and data structures shown separately could be combined and some programs, modules, and data structures could be separated.

FIG. 2C is a diagram illustrating a secondary mapping table 236 included in FIGS. 2A and 2B, in accordance with some embodiments. In some embodiments, secondary mapping table 236 is used for translating logical IDs of nodes of a tiered data structure to the corresponding physical locations of the corresponding nodes. For example, as shown in FIG. 2C, node logical ID "A" is translated to node physical location "5014," and similarly node logical ID "B" is translated to node physical location "183." In some embodiments, secondary mapping table 236 is a hash table that has an associated hash function that hashes a key (e.g., logical ID of a node in a tiered data structure) to a corresponding value (e.g., physical location of a node in a tiered data structure). For example, the hash function in FIG. 2C would hash key "A," to value "5014." Alternately, in some embodiments, secondary mapping table 236 may be organized in any manner that facilitates efficient lookup operations, e.g., binary tree, content addressable memory, or the like.

Figure 3:
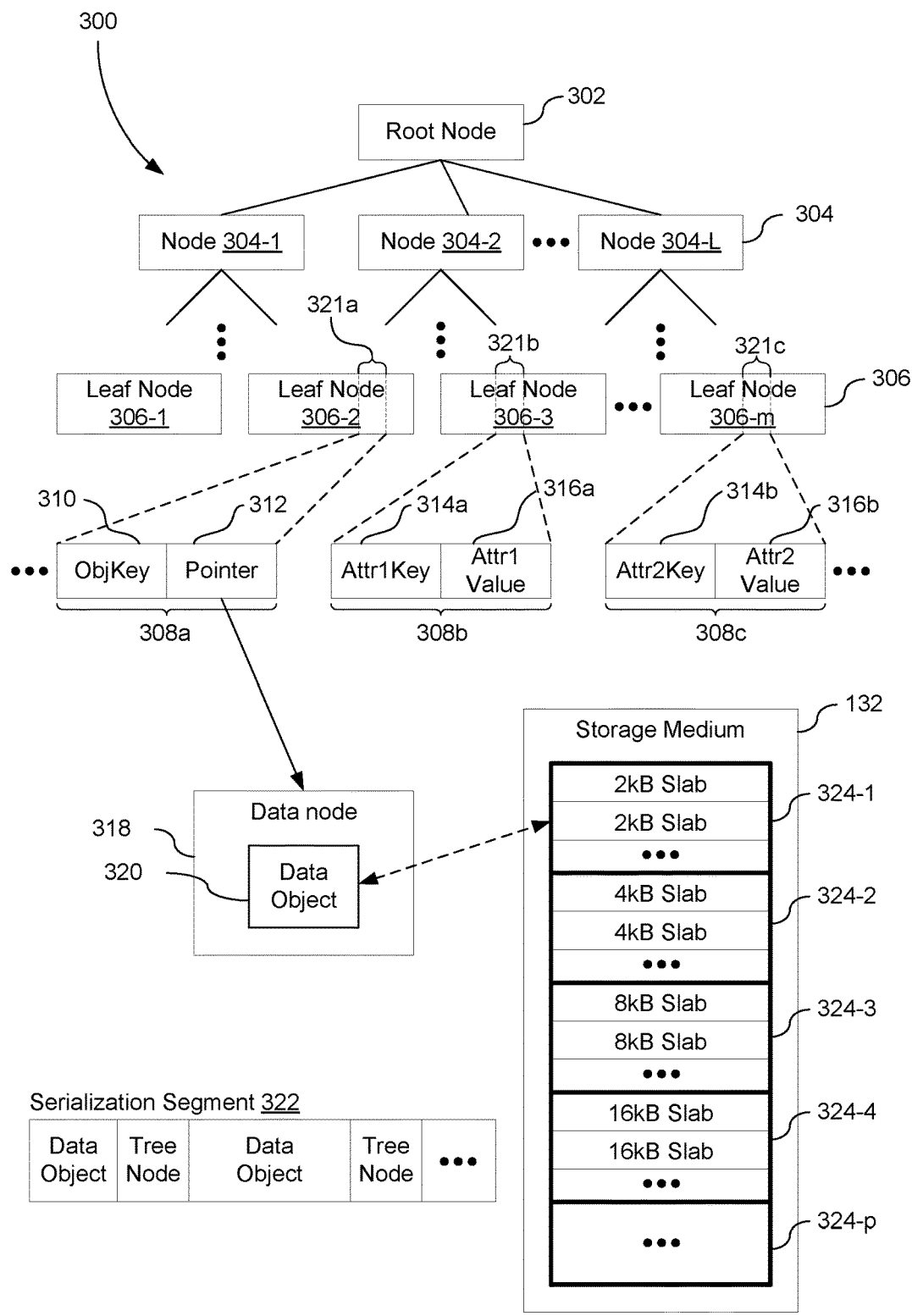
FIG. 3 is a conceptual diagram of a tiered data structure, in accordance with some embodiments.

FIG. 3 is a simplified, conceptual diagram of a tiered data structure 300 (e.g., a B-tree), a type of data structure that is commonly used in databases and file systems. The root node 302 is the highest point within the tiered data structure 300 and serves as the parent node for all other nodes within the tiered data structure (i.e., the root node has a node depth of zero). In some embodiments, beneath the root node 302 are internal (non-leaf) nodes 304 (e.g., Nodes 304-1-304-L) and leaf nodes 306 (e.g., Leaf Nodes 306-1-306-m). Internal nodes 304 may have a variable number of child nodes. Furthermore, each leaf node and internal node other than root node 302 has a parent node containing entries that point to or otherwise reference its child nodes. A child node with no child nodes of its own is called a leaf node. Entries in the leaf nodes 306 point to or otherwise reference specific data nodes 318, or specific data objects 320 stored within specific data nodes 318, which may be stored in non-volatile memory such as storage medium 132.

In some embodiments, non-volatile memory is organized into groups of fixed size segments (e.g., segments 324-1, 324-2 through 324-p). Each segment is further partitioned into a group of fixed size slabs. All the slabs within a particular segment have the same size (e.g., segment 324-1 is a 2 kB slab segment). Optionally, a variety of slab sizes are supported by dividing the full set of segments into groups, with a different slab size for each group. In some embodiments, data object 320 is stored in a slab within a segment. Such a situation is depicted in FIG. 3, wherein data object 320 is stored in a 2 kB slab of segment 324-1 in storage medium 132.

In some embodiments, various portions of the tiered data structure 300 are cached in volatile memory (e.g., in DRAM). For example, in one embodiment, all of the internal nodes 304 are cached, but only a portion of the leaf nodes 306 are cached. In another embodiment, all of the internal nodes 304, and none of the leaf nodes 306 are cached. In some embodiments, the portion of the leaf nodes that is cached is determined by how frequently the corresponding data objects are accessed. For example, leaf nodes corresponding to data objects accessed more frequently than other data objects, by a predefined margin, are added to the portion of the leaf nodes that are cached, and leaf nodes corresponding to data objects that are accessed less frequently than other data objects, by a predefined margin, are removed from or not added to the cache. The caching of portions of the tiered data structure can help reduce the number of I/O operations required to perform data access operations, for example by avoiding additional I/O operations to access nodes stored in storage medium 132 in storage device 120.

In some embodiments, each node (i.e., root node 302, internal nodes 304, and leaf nodes 306) of the tiered data structure 300 has a corresponding logical ID, which is used to access the node using a hash table (e.g., secondary mapping table 236-1, FIG. 2A). The hash table is used to translate the logical ID of a node to its physical location in non-volatile memory. In some embodiments, when a respective node (e.g., leaf node 306) is modified, the updated or modified node is written to a different physical location, and the hash table is updated without changing the nodes above the modified node (e.g., leaf node 306-1 is modified and internal node 304-1 and root node 302 are not updated). The nodes above the modified node do not need to be modified because the logical ID of the modified node remains unchanged, and thus the content of the parent of the modified node, which includes the logical ID of the modified node, is not affected by the modification of the respective node. Updating the hash table without modifying the internal and root nodes avoids additional I/O operations. Further, updating the hash table without modifying the internal and root nodes decreases writes to the non-volatile memory and thus decreases write-amplification.

A leaf node 306 may store a variable number of keys and values. Often included amongst these keys and values are data object keys 310, data object pointers 312, attribute keys 314 (e.g., attribute key 314a-314b), and attribute values 316 (e.g., attribute value 316a-316b). Attribute values are sometimes herein called attributes, for ease of discussion. Furthermore, in some embodiments, an attribute, or attribute value, comprises both an attribute identifier (e.g., identifying a type of attribute) and a value (e.g., "color, red," where "color" is the attribute identifier, and "red" is the value). However, the present discussion is applicable without regard to the exact form or content of such attributes.

Each key/value pair in a leaf node is sometimes herein called an entry or tree entry 308 (e.g., tree entry 308a-308c). In some embodiments, keys are used to uniquely identify an entity, such as a data object or attribute, and thus the key in each tree entry 308 typically has a different value from the key in every other tree entry. Data object pointers 312 point to data objects 320 that may be stored within non-volatile memory (e.g., information in data object pointers 312 includes addresses to physical locations within the non-volatile memory). In some embodiments, attributes include source information, date information, or the like for particular data objects. A data object 320 may have any number of attributes associated with the data object.

Attribute values 316 are typically much smaller than their associated data objects. In some embodiments, when an attribute value meets (e.g., is smaller than) a predefined attribute size threshold, the attribute and its associated key are stored as a tree entry in a leaf node, and otherwise the attribute value is stored in a data node pointed to by a respective tree entry 308 in a leaf node. Similarly, in some embodiments, when a data object meets (e.g., is smaller than) a predefined object size threshold, the object and its key are stored as a tree entry in a leaf node. In FIG. 3, object pointer 312 would be replaced with the data object itself when the data object meets the predefined object size threshold.

As noted above, an attribute key 314 and its associated attribute value 316 (e.g., attribute one key 314a and attribute one value 316a) are called sometimes called a key/value pair 308. A data object key 310 and its associated data object pointer 312 also constitute a key/value pair. Individual key/value pairs 308 are typically stored contiguously within the leaf node into which they are placed. For example, data object key 310 and data object pointer 312 are stored as tree entry 308a, which occupies a contiguous portion or block 321 (contiguous portion 321a in this example) of a respective leaf node 306 (node 306-2 in this example). Similarly, tree entry 308b is stored in contiguous portion 321b of leaf node 306-3, and tree entry 308c is stored in contiguous portion 321c of leaf node 306-m.

In some embodiments, a logical to physical and physical to logical map (e.g., L2P and P2L address map 226-1, FIG. 2A) maps physical addresses in storage medium 132 to logical addresses (e.g., logical addresses used by a host computer system), and is stored at storage controller 124 or remote from storage controller 124. Physical to logical mapping 226-1 is typically indexed or keyed by physical addresses assigned to or associated with blocks of physical memory in storage medium 130, and maps physical addresses to corresponding logical addresses and optionally maps physical addresses to metadata values. In some embodiments, at least some of the metadata values for particular memory portions, at respective physical addresses, are stored in data structures separate from the physical to logical address map 226-1.

In some embodiments, serialization segment 322 is created and includes coalesced data objects and mapping information (e.g., B-tree nodes). In some embodiments, a serialization segment will accumulate data objects and mapping information in an alternating fashion until the serialization segment is full and the contents are written to one or more storage devices of the plurality of storage devices of the storage system in a single contiguous write. In some embodiments tree nodes in the serialization segment are a fixed size (e.g., 8 kB), while data objects in the serialization segment are not a fixed size.

Figure 4:
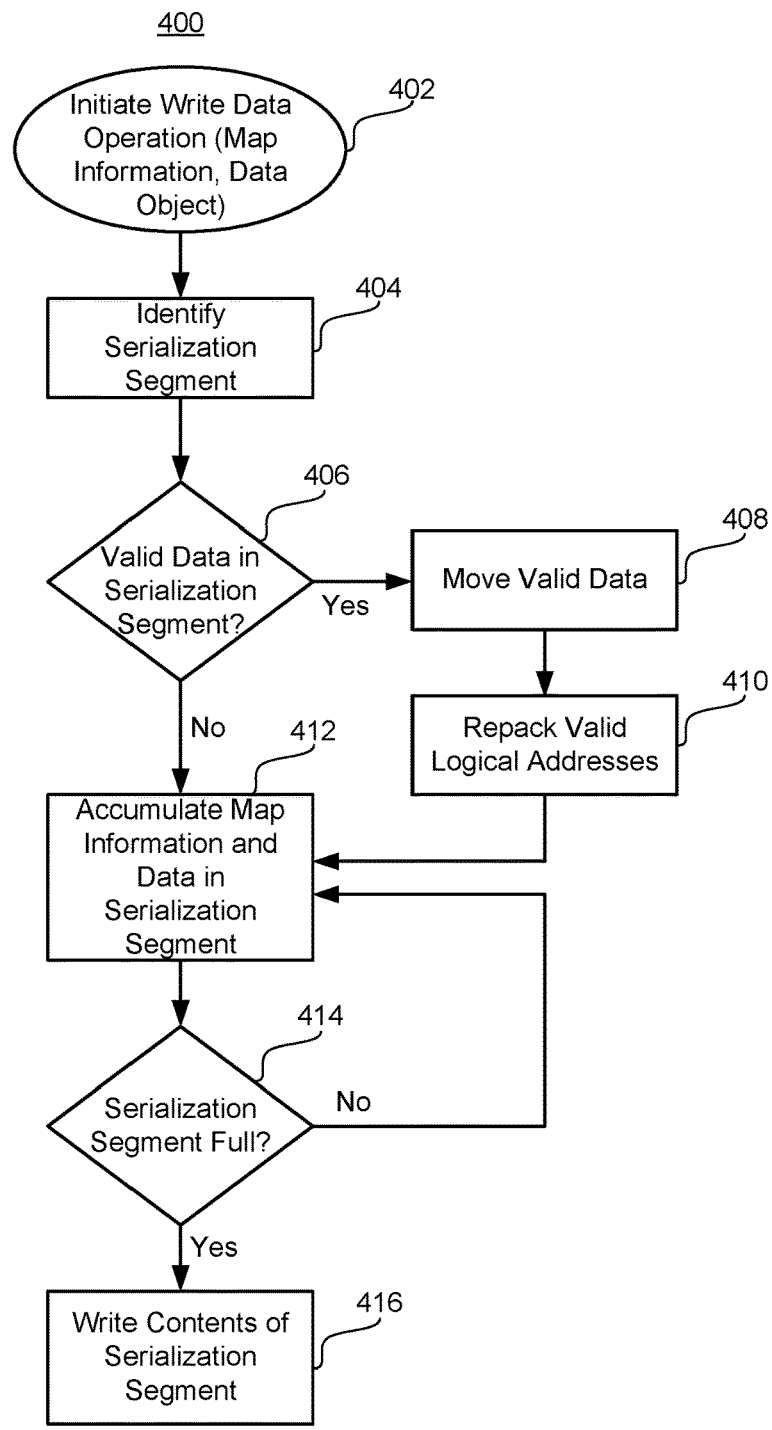
FIG. 4 is a conceptual flowchart of a write serialization operation, in accordance with some embodiments.

FIG. 4 illustrates a conceptual flow chart representation of methods of managing a data storage system, in accordance with some embodiments. More specifically, FIG. 4 illustrates a conceptual flow chart representation of a write serialization operation performed within a data storage system (e.g., data storage system 100, FIG. 1) having a tiered data structure (e.g., tiered data structure 300, FIG. 3), in accordance with some embodiments. With reference to the data storage system 100 depicted in FIG. 1, in some embodiments, a method 400 is performed at a computer system (e.g., computer system 110). In some embodiments, the method 400 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 400 are performed by executable software (e.g., device driver 216) that exists within a non-transitory computer-readable storage medium, such as memory 206-1 (FIG. 2A).

In some embodiments, some of the operations (or alternatively, steps) of method 400 are performed by a storage device (e.g., storage device 120), or one or more components of the storage device (e.g., storage controller 124), that is operatively coupled with the storage device and other operations of method 400 are performed at the host system. In some of these embodiments, the method 400 is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 400 as performed by the host system (e.g., by CPUs 202 and device driver 216 of computer system 110, FIG. 2A). With reference to FIG. 2A, in some embodiments, the operations of method 400 are performed, at least in part, by a receiving module (e.g., receiving module 218-1); a write module (e.g., write module 220-1); and within the write module, a serializing module (e.g., serializing module 222-1); and within the serializing module, a coalescing module (e.g., coalescing module 224-1); a serialization segment buffer (e.g., serialization segment buffer 228-1); a read module (e.g., read module 230-1); a tiered data structure access module (e.g., tiered data access module 232-1); within the tiered data structure access module, an access module (e.g., access module 234-1), and a secondary mapping table (e.g., secondary mapping table 236-1); a cache (e.g., cache 238-1); and within the cache, a cache lookup table (e.g., cache lookup table 240-1), and cached portions of tiered data structure (e.g., cached portions of tiered data structure 242-1).

Method 400 begins, in some embodiments, when the host system (e.g., computer system 110, FIG. 1, or a component thereof, such as device driver 216, FIG. 2A) requests to access a data object (e.g., data object 320, FIG. 3) within a tiered data structure (e.g., tiered data structure 300, FIG. 3). In some embodiments, the host system initiates 402 a write data operation (e.g., using write module 220-1, FIG. 2A). In some embodiments, initiating 402 the write data operation includes a first write of updated mapping information to a tiered data structure, and a second write of data to be written for the data object. In some embodiments, there is more than one write to the tiered data structure (e.g., if there is a B-tree split or coalescing). In some embodiments, the first write and the second write are to at least two distinct nodes of the tiered data structure (e.g., tiered data structure 300, FIG. 3), at two or more distinct levels of the tiered data structure.

Further, in some embodiments, initiating 402 the write data operation includes requesting that the data object be stored in a data storage device (e.g., storage device 120, FIG. 1). In some embodiments, initiating 402 the write data operation includes specifying a data storage device (e.g., storage device 120, FIG. 1) to which the data object is to be written.

After initiating 402 the write data operation, the host system (e.g., computer system 110, FIG. 1, or a component thereof, such as device driver 216, FIG. 2A) identifies 404 a serialization segment (e.g., serialization segment 322, FIG. 3) in a memory, distinct from the plurality of storage devices (e.g., in a serialization segment buffer 228-1, FIG. 2A). For example, in some embodiments, the serialization segment is stored in volatile DRAM, NVDIMM, SSD, and/or NVRAM in an I/O device (e.g., PCIe, SAS, SATA, etc.). In some embodiments, identifying the serialization segment 404 requires creating the serialization segment in a memory, distinct from the plurality of storage devices.

In some embodiments, identifying the serialization segment 404 includes identifying the serialization segment, from among a plurality of serialization segments, in accordance with one or more predefined characteristics of the data to be written. For example, in some embodiments, the serialization segment corresponds to a selected stripe of a plurality of stripes of logical address space, and identifying the serialization segment includes identifying the serialization segment in accordance with selection criteria, such as identifying a stripe that is least full in a plurality of stripes in the logical address space. Another example is identifying a stripe in accordance with an algorithm based on the particular garbage collection scheme of the host-based garbage collection operation. Yet another example is selecting a partition of the storage devices in accordance with one or more predefined characteristics of the data, and then selecting one of M serialization segments for that partition in accordance with selection criteria.

In some embodiments, multiple serialization segments are used to group data objects with similar expected lifetimes in order to reduce write amplification (e.g., using multiple serialization segment buffers 228-1, FIG. 2A). For example, the type of data may be "hot" (changing frequently), "cold" (changing infrequently), or any type in between, and each of the plurality of serialization segments is used to group a corresponding type of data. For example, in some embodiments, mapping information is stored in separate serialization segments from data objects in accordance with expected lifetimes of the mapping information and data objects.

In some embodiments, valid data exists in an identified serialization segment, and determination operation 406 determines if valid data exists in the identified serialization segment. In some embodiments, if valid data already exists within the identified serialization segment (i.e., 406—"yes"), the valid data in the identified serialization segment is moved 408 (e.g. using coalescing module 224-1, FIG.

2A). In some embodiments, for each "chunk" (or contiguous sequence of valid logical addresses) in the serialization segment, instructions are sent from the host system to one or more storage devices of the plurality of storage devices to move data corresponding to the respective contiguous sequence of valid logical addresses.

In some embodiments, the instructions to move data include remap instructions (i.e., a remap operation) that change logical addresses in the serialization segment associated with memory portions in the plurality of storage devices from initial logical addresses to new (or different) logical addresses in the serialization segment, without causing physical movement of data. In some embodiments, a remap operation allows the host to move data by remapping the location of the data to the beginning of the serialization segment, and does not require copying data to the host during the move data operation. For example, valid data existing in an identified serialization segment is remapped to the start of the identified serialization segment (without causing physical movement of the data) in order to prevent fragmenting new data that is written after the remap operation.

The operation of moving existing valid data to the start of a serialization segment is sometimes herein called "compacting." Applying a remap operation to a compacting operation of write serialization can significantly reduce the data written by the host to storage device(s). The data movement required by compacting logical addresses via remap operations is confined to the storage devices, which typically have much more available bandwidth than the communication buses between the host and the storage devices. For example, under a uniform random write workload, a flash storage subsystem with 28% overprovisioning typically has a write amplification of 2.5. This means that for every byte of data written, an extra 1.5 bytes are written to compact data during garbage collection. Without the remap operation, the extra 1.5 bytes would have to be written by the host, consuming 150% of additional write bandwidth. The benefits of compacting by applying one or more remap operations are even more significant if overprovisioning is less than 28%.

In some embodiments, the instructions to move data include xcopy instructions (i.e., an xcopy operation) that copy data corresponding to valid logical addresses in the serialization segment from initial memory portions in the plurality of storage devices to different memory portions in the plurality of storage devices corresponding to new (or different) logical addresses in the serialization segment. In some embodiments, an xcopy operation does not require copying data to the host during the move data operation. Further, the host can schedule xcopy operations to minimize their interaction with read operations and obtain more consistent read latencies.

In some embodiments, remap and xcopy operations operate on a single block, while in other embodiments, remap and xcopy operations operate on ranges of blocks (e.g., contiguous range of blocks. In some embodiments, remap and xcopy operations operate to move data from one contiguous range of logical addresses to another contiguous range of logical addresses (e.g., remap from addresses c-d to a-b). In some embodiments, remap and xcopy operations operate to move data in a vectored manner, where multiple remap or xcopy operations are bundled into a single command to improve performance. Further, the single command to move data in a vectored manner includes a list of distinct logical address ranges that the remap and xcopy operations are performed at.

In some embodiments, valid logical addresses are repacked 410 according to the move data operation. For example, data that is moved using a remap operation will typically have new logical addresses at the beginning of the serialization segment that must be repacked accordingly. Likewise, moving data with an xcopy operation requires repacking logical addresses according to the new location of the data.

In some embodiments, if valid data does not already exist within the identified serialization segment (i.e., 406—"no"), or if existing valid data in an identified serialization segment has already been moved 408 and the logical addresses repacked 410, mapping information and new data is accumulated 412 in the identified serialization segment (e.g., using serializing module 222-1, FIG. 2A). For example, if valid data is moved to the beginning of the identified serialization segment, new data and mapping information is accumulated in the remainder of the identified serialization segment. Alternately, if the identified serialization segment has no existing valid data, new data and mapping information is accumulated starting at the beginning of the identified serialization segment.

In some embodiments, new data and mapping information are accumulated 412 in the identified serialization segment until the identified serialization segment is determined 414 to be full. In some embodiments, if the identified serialization segment is determined to be full (i.e., 414—"yes"), the contents of the identified serialization segment are written 416 to one or more storage devices of the plurality of storage devices of the storage system. In some embodiments, the contents of the serialization segment are written to one or more storage devices in a single contiguous write, where the single contiguous write is one I/O operation from the host perspective. In other embodiments, the single contiguous write, from the host perspective, is broken into chunks that are (optionally, randomly) scattered across a plurality of storage devices.

In some embodiments, it is not possible to accumulate an entire serialization segment in NVRAM (e.g., because there is insufficient NVRAM to store the entire serialization segment, or because multiple serialization segments are in use and there is insufficient NVRAM to concurrently store the contents of the multiple serialization segments), and writes are coalesced as they are accumulated in a serialization segment using a "batch commit" algorithm. In "batch commit," multiple serialized writes that occur within a specified window of time are collected into a batch and written as a single I/O. In some embodiments, none of the batched writes are acknowledged as complete until the single combined I/O is complete. In some embodiments, the specified window of time is sufficiently small such that client response times are not significantly extended.

In some embodiments, write serialization is used to optimize a software RAID implementation by accumulating many small writes into a complete RAID stripe and writing the RAID parity once for the entire stripe. Write serialization in a software RAID application avoids extra I/O operations by serializing multiple small writes (that would otherwise be written individually) into an entire RAID stripe before writing to storage in a single I/O operation. In a software RAID application using write serialization, the compaction process requires the host to read existing valid data in the identified serialization segment so that the parity for the entire segment can be computed. However, the existing valid data does not need to be rewritten (only read), which lessens write amplification and avoids using additional write bandwidth between host and storage devices.

Additional details concerning each of the processing steps for method 400, as well as details concerning additional processing steps, are presented below with reference to FIGS. 5A-5C.

Figure 5A:
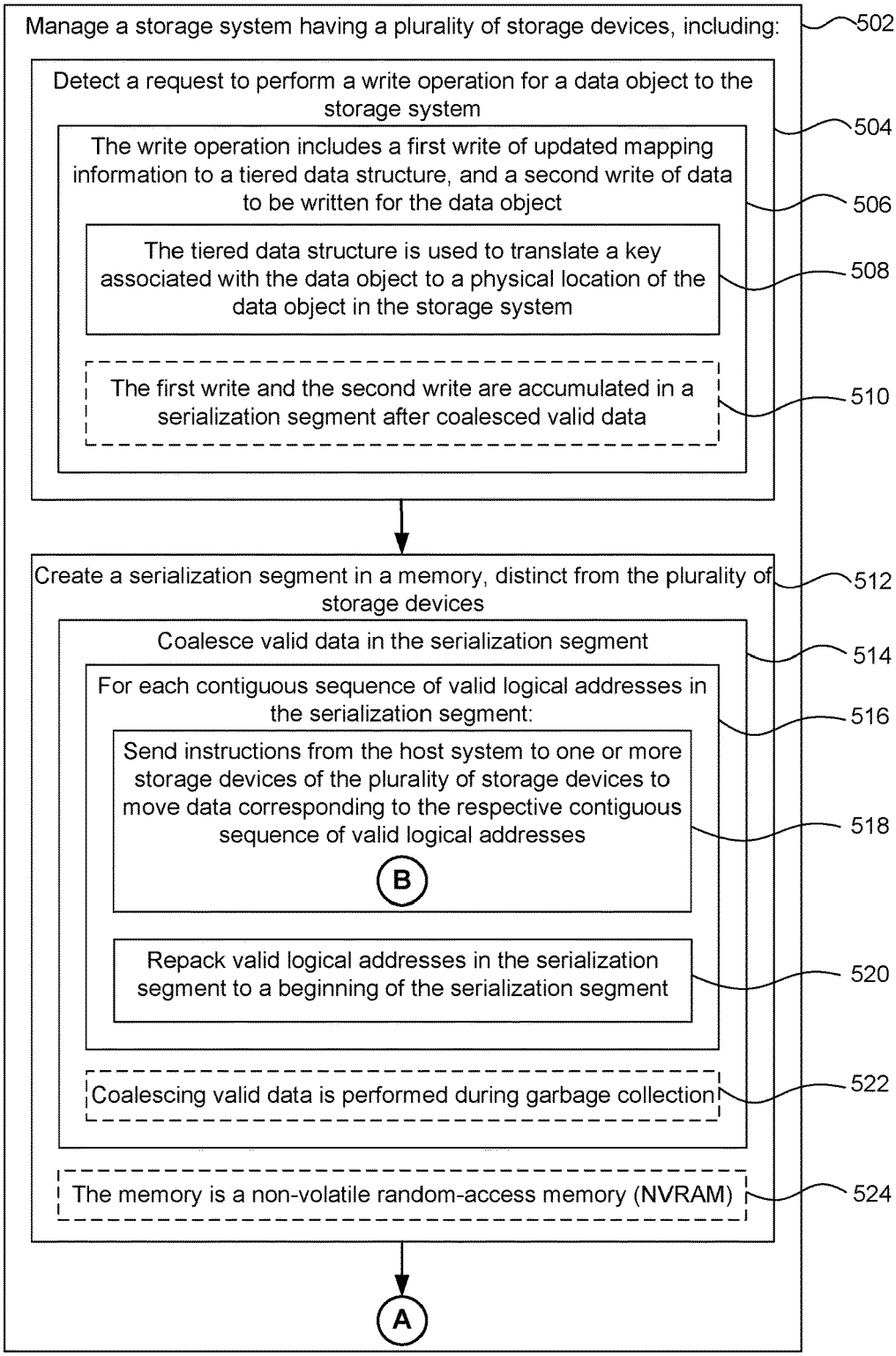
FIGS. 5A-5C illustrate a flowchart representation of a method of managing a storage system, in accordance with some embodiments.
Figure 5B:
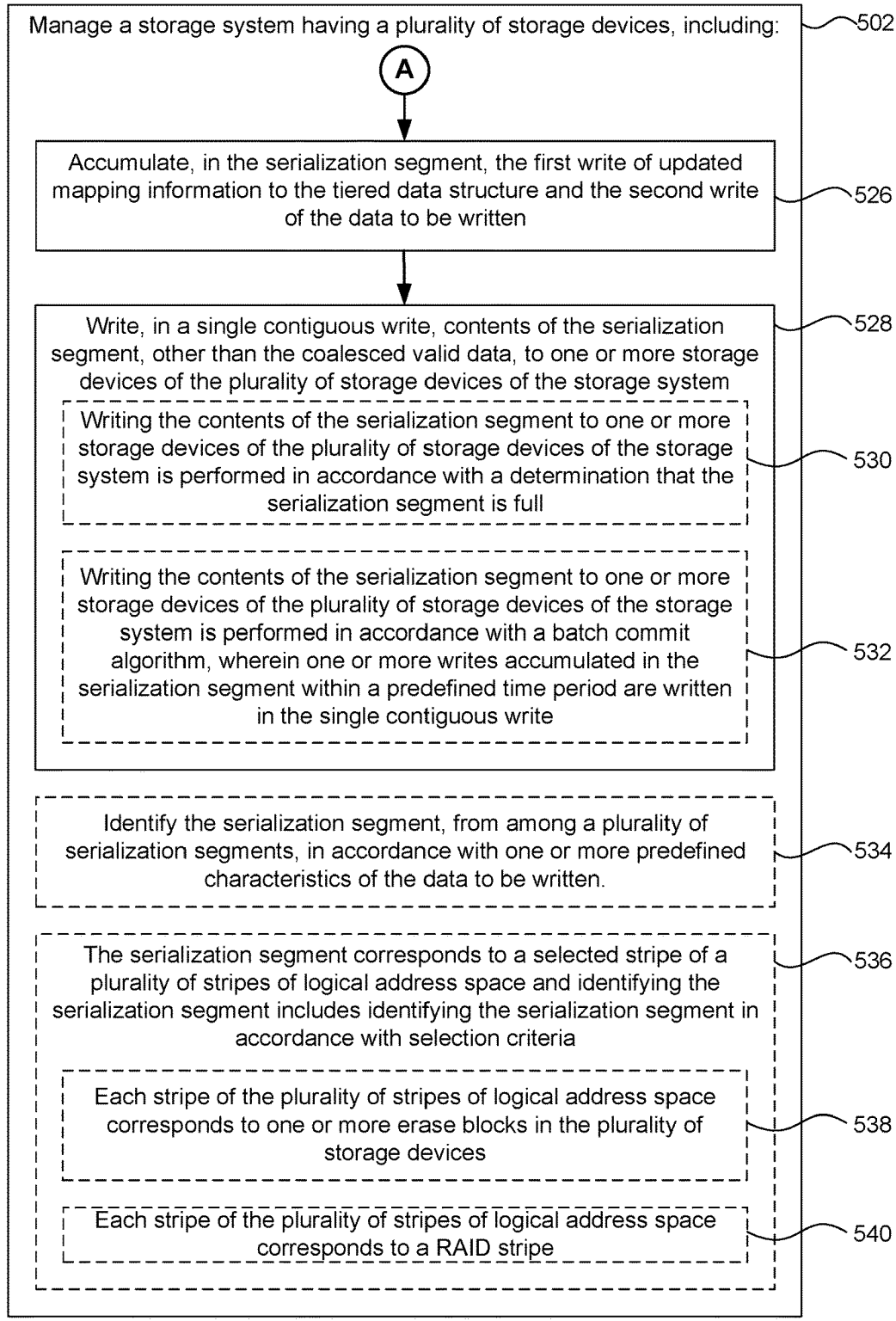
Figure 5C:
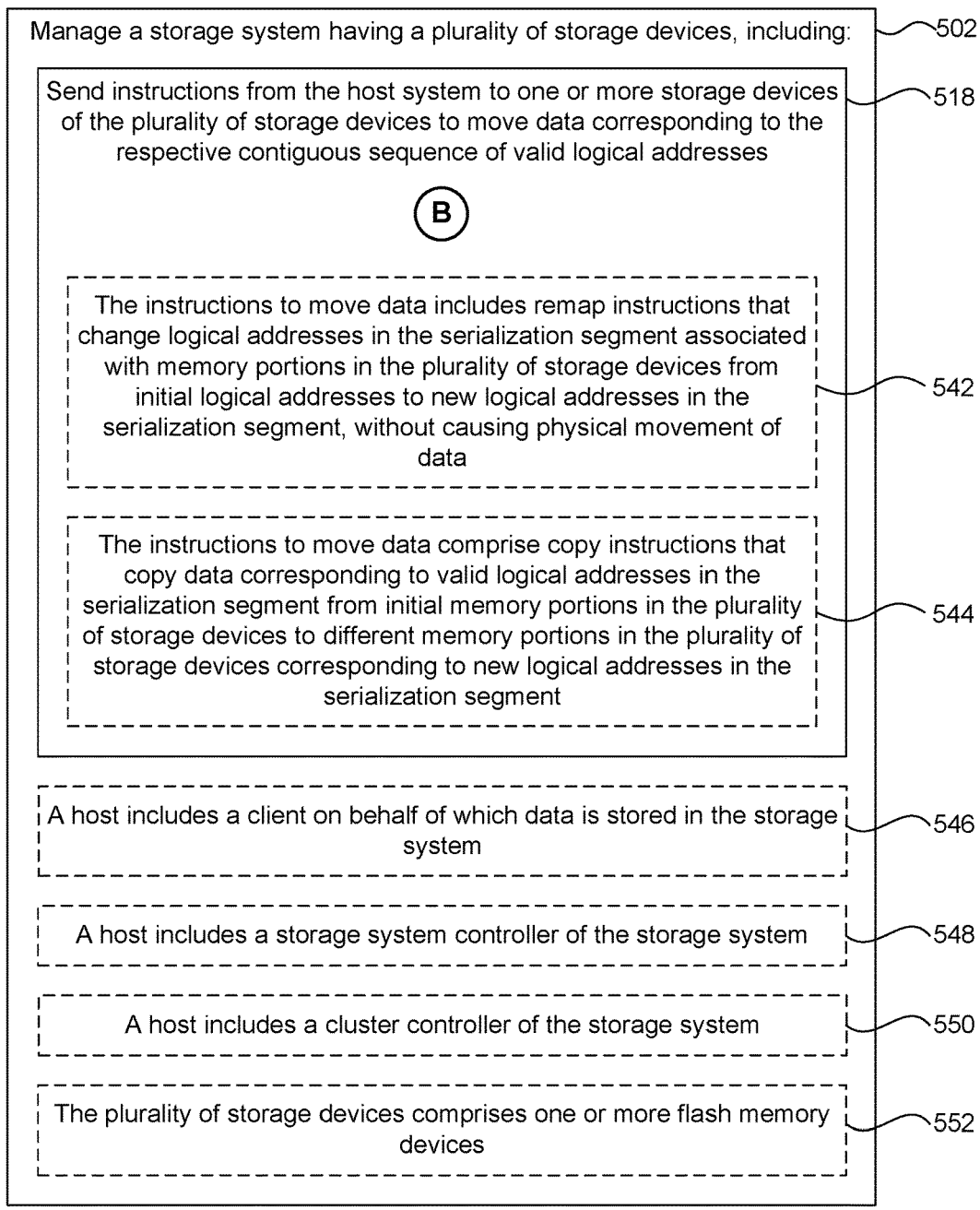

FIGS. 5A-5C illustrate a flowchart representation of a method of managing a data storage system employing a tiered data structure, in accordance with some embodiments. With reference to the data storage system 100 depicted in FIG. 1, in some embodiments, a method 500 is performed at a computer system (e.g., computer system 110). In some embodiments, the method 500 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 500 are performed by executing software (e.g., device driver 216) stored in a non-transitory computer-readable storage medium, such as memory 206-1 (FIG. 2A).

In some embodiments, some of the operations (or alternatively, steps) of method 500 are performed by a storage device (e.g., storage device 120), or one or more components of the storage device (e.g., storage controller 124), that is operatively coupled with the storage device and other operations of method 500 are performed at the host system. In some of these embodiments, the method 500 is governed, at least in part, by instructions stored in a non-transitory computer-readable storage medium and that are executed by one or more processors of a device, such as the one or more processing units (CPUs) 122 of management module 121 (FIG. 2B).

For ease of explanation, the following describes method 500 as performed by the host system (e.g., by CPUs 202 and device driver 216 of computer system 110, FIG. 2A). With reference to FIG. 2A, in some embodiments, the operations of method 500 are performed, at least in part, by a receiving module (e.g., receiving module 218-1); a write module (e.g., write module 220-1); and within the write module, a serializing module (e.g., serializing module 222-1); and within the serializing module, a coalescing module (e.g., coalescing module 224-1); a serialization segment buffer (e.g., serialization segment buffer 228-1); a read module (e.g., read module 230-1); a tiered data structure access module (e.g., tiered data structure access module 232-1); within the tiered data structure access module, an access module (e.g., access module 234-1), and a secondary mapping table (e.g., secondary mapping table 236-1); a cache (e.g., cache 238-1); and within the cache, a cache lookup table (e.g., cache lookup table 240-1), and cached portions of tiered data structure (e.g., cached portions of tiered data structure 242-1).

With reference to FIGS. 5A-5C, the host system (e.g., computer system 110, or a component thereof, such as device driver 216, FIG. 2A) manages 502 a storage system (e.g., data storage system 100, FIG. 1) having a plurality of storage devices (e.g., NVM devices 134 in storage device 120, FIG. 1). Method 500 includes detecting 504 a request to perform a write operation for a data object to the storage system, wherein the write operation includes 506 a first write of updated mapping information to a tiered data structure, and a second write of data to be written for the data object. Further, the tiered data structure is used to translate 508 a key associated with the data object to a physical location of the data object in the storage system. Translation of a key is discussed above with reference to FIGS. 2C and 3. In some embodiments, the first write and the second write are accumulated 510 in a serialization segment after coalesced valid data. See discussion below of coalescing valid data in a serialization segment, with respect to operations 514-522 of method 500, and the discussion above with respect to operations 408 and 410 of method 400 (FIG. 4).

In some embodiments, after detecting 504 a request to perform a write operation for a data object to the storage system, the method includes creating 512 a serialization segment in a memory, distinct from the plurality of storage devices. Creating 512 a serialization segment in a memory, includes coalescing 514 valid data in the serialization segment. Further, coalescing valid data in the serialization segment includes, for each contiguous sequence of valid logical addresses in the serialization segment 516: (1) sending 518 instructions from the host system to one or more storage devices of the plurality of storage devices to move data corresponding to the respective contiguous sequence of valid logical addresses, as explained above with reference to FIGS. 4 (408); and (2) repacking 520 valid logical addresses in the serialization segment to a beginning of the serialization segment, as explained above with reference to FIG. 4 (410). In some embodiments, coalescing valid data is performed 522 during garbage collection. In some embodiments, garbage collection is host-based and uses either the remap or xcopy operations, as explained above with reference to FIGS. 4 (408 and 410), to decrease the number of I/O operations required for moving data and repacking logical addresses.

In some embodiments, the memory in which the serialization segment is created is non-volatile random-access memory 524 (NVRAM). For example, in some embodiments, a serialization segment is stored in a buffer in NVRAM at the host (e.g., in serialization segment buffer 228-1, FIG. 2A). In some embodiments, the NVRAM is in an external device accessed via a protocol such as PCIe, SAS, SATA, or the like.

In some embodiments, method 500 includes, accumulating 526, in the serialization segment, the first write of updated mapping information to the tiered data structure and the second write of the data to be written. In some embodiments, after performing accumulating operation 526, method 500 includes writing 528, in a single contiguous write, contents of the serialization segment, other than the coalesced valid data, to one or more storage devices of the plurality of storage devices of the storage system. In some embodiments, as explained above with reference to FIG. 4 (412-416), writing 530 the contents of the serialization segment to one or more storage devices of the plurality of storage devices of the storage system is performed in accordance with a determination that the serialization segment is full. In some embodiments, writing 532 the contents of the serialization segment to one or more storage devices of the plurality of storage devices of the storage system is performed in accordance with a batch commit algorithm, as explained above with reference to FIG. 4 (416), wherein one or more writes accumulated in the serialization segment within a predefined time period are written in the single contiguous write.

In some embodiments, the method includes identifying 534 the serialization segment, from among a plurality of serialization segments, in accordance with one or more predefined characteristics of the data to be written. For example, in some embodiments, each serialization segment is a host-based data buffer (e.g., serialization segment buffer 228-1, FIG. 2A) that is used to group data with certain characteristics (e.g., similar lifetimes, similar predicted usage patterns). Further, in some embodiments, a serialization segment corresponds 536 to a selected stripe of a plurality of stripes of logical address space, and identifying the serialization segment includes identifying the serialization segment in accordance with selection criteria. Additionally, in some embodiments, each stripe of the plurality of stripes of logical address space corresponds 538 to one or more erase blocks in the plurality of storage devices. In some embodiments, the size of an erase block is prohibitively large (e.g., if an erase block is multiple MB in size). In such cases, each stripe of the plurality of stripes of logical address space corresponds to portions of erase blocks in the plurality of storage devices. In some embodiments, each stripe of the plurality of stripes of logical address space corresponds 540 to a RAID stripe.

In some embodiments, sending 518 instructions from the host system to one or more storage devices of the plurality of storage devices to move data corresponding to the respective contiguous sequence of valid logical addresses, includes 542 remap instructions that change logical addresses in the serialization segment associated with memory portions in the plurality of storage devices from initial logical addresses to new logical addresses in the serialization segment, without causing physical movement of data, as explained above with reference to FIG. 4 (408). In other embodiments, sending 518 instructions from the host system to one or more storage devices of the plurality of storage devices to move data corresponding to the respective contiguous sequence of valid logical addresses, includes 544 copy (xcopy) instructions that copy data corresponding to valid logical addresses in the serialization segment from initial memory portions in the plurality of storage devices to different memory portions in the plurality of storage devices corresponding to new logical addresses in the serialization segment, as explained above with reference to FIG. 4 (408).

In some embodiments, managing 502 a storage system having a plurality of storage devices is controlled by a host that includes 546 a client on behalf of which data is stored in the storage system (e.g., data storage system 100, FIG. 1). In some embodiments, the client is or includes an entity on behalf of which data is stored in the storage system. For example, in some embodiments, the host is computer system 110 (FIG. 1) that executes a client process, module or application.

In some embodiments, the host includes 548 a storage system controller of the storage system. In some embodiments, the storage system controller controls and/or coordinates operations among one or more storage devices (e.g., data storage device 120, FIG. 1). In some embodiments, the storage system controller is an entity with processing power closest to the storage device. For example, in some embodiments, in some storage systems, the host is an intermediary node between one or more storage devices and a client.

In some embodiments, the host includes 550 a cluster controller of the storage system. In some embodiments, the cluster controller controls and/or coordinates operations among one or more data storage subsystems, where each of the data storage subsystems may be implemented as a data storage system having one or more storage devices (e.g., data storage device 120, FIG. 1). In some embodiments, the cluster controller is an entity with processing power between a client system and the storage device. In some embodiments, the storage device includes 552 one or more flash memory devices.

With respect to storage medium 132 (FIG. 1), it is noted that semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible (e.g., a NOR memory array). One of skill in the art will recognize that the NAND and NOR memory configurations are exemplary, and memory elements may be otherwise configured.

The semiconductor memory elements included in a single device, such as memory elements located within and/or over the same substrate or in a single die, may be distributed in a two- or three-dimensional manner (such as a two dimensional (2D) memory array structure or a three dimensional (3D) memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration (e.g., in an x-z plane), thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned wherein some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions described and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first target charge could be termed a second target charge, and, similarly, a second target charge could be termed a first target charge, without changing the meaning of the description, so long as all occurrences of the "first target charge" are renamed consistently and all occurrences of the "second target charge" are renamed consistently. The first target charge and the second target charge are both target charges, but they are not the same target charge.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system having a plurality of storage devices, the method comprising:
   detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object;

creating a serialization segment in a memory, distinct from the plurality of storage devices, wherein creating the serialization segment includes:
    coalescing valid data in the serialization segment, including:
        for each contiguous sequence of valid logical addresses in the serialization segment, sending instructions from a host system to one or more storage devices of the plurality of storage devices to move data corresponding to the respective contiguous sequence of valid logical addresses; and
        repacking valid logical addresses in the serialization segment to a beginning of the serialization segment;
    accumulating, in the serialization segment, the first write of updated mapping information to the tiered data structure and the second write of the data to be written; and
    writing, in a single contiguous write, contents of the serialization segment, other than the coalesced valid data, to one or more storage devices of the plurality of storage devices of the storage system.

2. The method of claim 1, wherein the instructions to move data comprise remap instructions that change logical addresses in the serialization segment associated with memory portions in the plurality of storage devices from initial logical addresses to new logical addresses in the serialization segment, without causing physical movement of data.

3. The method of claim 1, wherein the instructions to move data comprise copy instructions that copy data corresponding to valid logical addresses in the serialization segment from initial memory portions in the plurality of storage devices to different memory portions in the plurality of storage devices corresponding to new logical addresses in the serialization segment.

4. The method of claim 1, further comprising identifying the serialization segment, from among a plurality of serialization segments, in accordance with one or more predefined characteristics of the data to be written.

5. The method of claim 4, wherein:
the serialization segment corresponds to a selected stripe of a plurality of stripes of logical address space; and
identifying the serialization segment includes identifying the serialization segment in accordance with selection criteria.

6. The method of claim 5, wherein each stripe of the plurality of stripes of logical address space corresponds to one or more erase blocks in the plurality of storage devices.

7. The method of claim 5, wherein each stripe of the plurality of stripes of logical address space corresponds to a RAID stripe.

8. The method of claim 1, wherein the coalescing valid data is performed during garbage collection.

9. The method of claim 1, wherein the first write and the second write are accumulated in the serialization segment after the coalesced valid data.

10. The method of claim 1, wherein the memory is a non-volatile random-access memory (NVRAM).

11. The method of claim 1, wherein writing the contents of the serialization segment to one or more storage devices of the plurality of storage devices of the storage system is performed in accordance with a determination that the serialization segment is full.

12. The method of claim 1, wherein:
writing the contents of the serialization segment to one or more storage devices of the plurality of storage devices of the storage system is performed in accordance with a batch commit algorithm; and
one or more writes accumulated in the serialization segment within a predefined time period are written in the single contiguous write.

13. The method of claim 1, wherein the method is controlled by the host system that includes a client on behalf of which data is stored in the storage system.

14. A host system, comprising:
an interface for operatively coupling to a storage system having a plurality of storage devices;
one or more processors; and
controller memory storing one or more programs, which when executed by the one or more processors cause the host system to perform operations comprising:
    detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object;
    creating a serialization segment in a memory, distinct from the plurality of storage devices, wherein creating the serialization segment includes:
        coalescing valid data in the serialization segment, including:
            for each contiguous sequence of valid logical addresses in the serialization segment, sending instructions from the host system to one or more storage devices of the plurality of storage devices to move data corresponding to the respective contiguous sequence of valid logical addresses; and
            repacking valid logical addresses in the serialization segment to a beginning of the serialization segment;
        accumulating, in the serialization segment, the first write of updated mapping information to the tiered data structure and the second write of the data to be written; and
        writing, in a single contiguous write, contents of the serialization segment, other than the coalesced valid data, to one or more storage devices of the plurality of storage devices of the storage system.

15. The host system of claim 14, wherein the one or more programs include:
a coalescing module configured to coalesce valid data in the serialization segment, including sending instructions to the one or more storage devices of the plurality of storage devices to move valid data, and repacking valid logical addresses in the serialization segment; and
a serialization module configured to serialize data and updated mapping information in the serialization segment.

16. A storage system, comprising:
a plurality of storage devices;
one or more subsystems having one or more processors, the one or more processors including:

means for detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object;

means for creating a serialization segment in a memory, distinct from the plurality of storage devices, wherein the means for creating the serialization segment includes:

means for coalescing valid data in the serialization segment, including:

for each contiguous sequence of valid logical addresses in the serialization segment, means for sending instructions from a host system to one or more storage devices of the plurality of storage devices to move data corresponding to the respective contiguous sequence of valid logical addresses; and means for repacking valid logical addresses in the serialization segment to a beginning of the serialization segment;

means for accumulating, in the serialization segment, the first write of updated mapping information to the tiered data structure and the second write of the data to be written; and means for writing, in a single contiguous write, contents of the serialization segment, other than the coalesced valid data, to one or more storage devices of the plurality of storage devices of the storage system.

17. The storage system of claim 16, wherein the instructions to move data comprise remap instructions that change logical addresses in the serialization segment associated with memory portions in the plurality of storage devices from initial logical addresses to new logical addresses in the serialization segment, without causing physical movement of data.

18. The storage system of claim 16, wherein the instructions to move data comprise copy instructions that copy data corresponding to valid logical addresses in the serialization segment from initial memory portions in the plurality of storage devices to different memory portions in the plurality of storage devices corresponding to new logical addresses in the serialization segment.

19. The storage system of claim 16, wherein:

the serialization segment corresponds to a selected stripe of a plurality of stripes of logical address space; and the one or more programs include instructions for identifying the serialization segment in accordance with one or more predefined characteristics of the data to be written.

20. A non-transitory computer readable storage medium, storing one or more programs configured for execution by one or more processors of a storage system, the one or more programs including instructions that when executed by the one or more processors cause the storage system to perform a set of operations comprising:

detecting a request to perform a write operation for a data object to the storage system, wherein the write operation includes a first write of updated mapping information to a tiered data structure, the tiered data structure used to translate a key associated with the data object to a physical location of the data object in the storage system, and a second write of data to be written for the data object;

creating a serialization segment in a memory, distinct from the plurality of storage devices, wherein creating the serialization segment includes:

coalescing valid data in the serialization segment, including:

for each contiguous sequence of valid logical addresses in the serialization segment, sending instructions from the host system to one or more storage devices of the plurality of storage devices to move data corresponding to the respective contiguous sequence of valid logical addresses; and repacking valid logical addresses in the serialization segment to a beginning of the serialization segment;

accumulating, in the serialization segment, the first write of updated mapping information to the tiered data structure and the second write of the data to be written; and writing, in a single contiguous write, contents of the serialization segment, other than the coalesced valid data, to one or more storage devices of the plurality of storage devices of the storage system.

* * * * *